United States Patent [19]

Gerdes

[11] 4,276,064
[45] Jun. 30, 1981

[54] FIRE CONTROL SYSTEM FOR SPRAY BOOTH

[75] Inventor: Donald F. Gerdes, Park Ridge, Ill.

[73] Assignee: Binks Manufacturing Company, Franklin Park, Ill.

[21] Appl. No.: 740,120

[22] Filed: Nov. 8, 1976

Related U.S. Application Data

[63] Continuation of Ser. No. 591,162, Jun. 27, 1975, abandoned.

[51] Int. Cl.³ .............................................. B01D 47/00
[52] U.S. Cl. ........................................ 55/217; 55/228; 55/229; 55/241; 55/421; 98/115 SB; 169/54; 210/539
[58] Field of Search ................. 55/217, 228, 229, 240, 55/241, 421; 98/115 SB; 169/54, 60, 61; 210/538–540, DIG. 25

[56] References Cited

U.S. PATENT DOCUMENTS

| | | | |
|---|---|---|---|
| 1,174,549 | 3/1916 | Cully | 210/539 |
| 1,305,180 | 5/1919 | Throop | 98/115 SB X |
| 2,266,335 | 12/1941 | Roche, Jr. et al. | 98/115 SB X |
| 2,664,955 | 1/1954 | Winkler | 169/54 X |
| 2,826,306 | 3/1958 | Burns | 210/539 X |
| 2,829,582 | 4/1958 | Abbott et al. | 98/115 SB |
| 3,208,534 | 9/1965 | Kazarian | 169/54 |
| 3,341,016 | 9/1967 | Paasche | 55/240 X |
| 3,785,124 | 1/1974 | Gaylord | 55/217 X |
| 3,844,944 | 10/1974 | Mercuri | 210/DIG. 25 X |

*Primary Examiner*—Kathleen J. Prunner
*Attorney, Agent, or Firm*—Gary, Juettner & Pyle

[57] ABSTRACT

A system is provided for extinguishing accidental fires in paint spray booths of the type wherein oil is used as the medium for eliminating extraneous paint mist and overspray, said system providing control over both the oil and the medium used for extinguishing the fire. In such a spray booth, oil from a self-contained reservoir located at the bottom of the booth is circulated over a plurality of baffles within the booth. Paint mist is drawn by flow of air into contact with the oil covered baffles, and the paint solids are thereby entrained in the oil and collected in the oil reservoir. An appropriate fire extinguishing system for such spray booth comprises a plurality of water fog nozzles within the booth that are activated in response to a fire, and which therefore discharge water into the reservoir. Pursuant to the invention, means are provided to control and preserve the oil which is displaced by water accumulating in the oil reservoir, to maximize fire-fighting efficiency, and to discharge excess water from the booth while safely retaining the oil.

4 Claims, 7 Drawing Figures

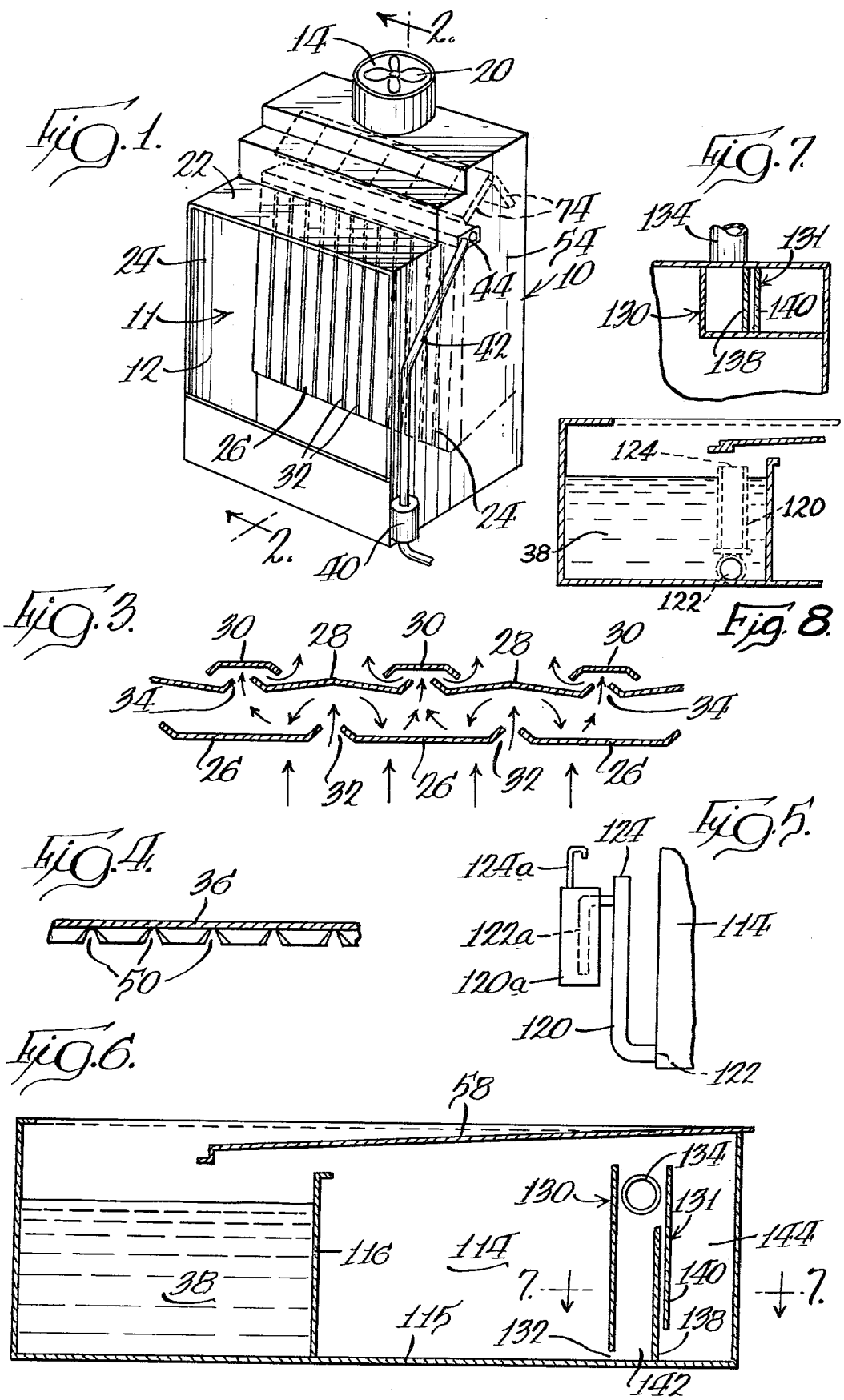

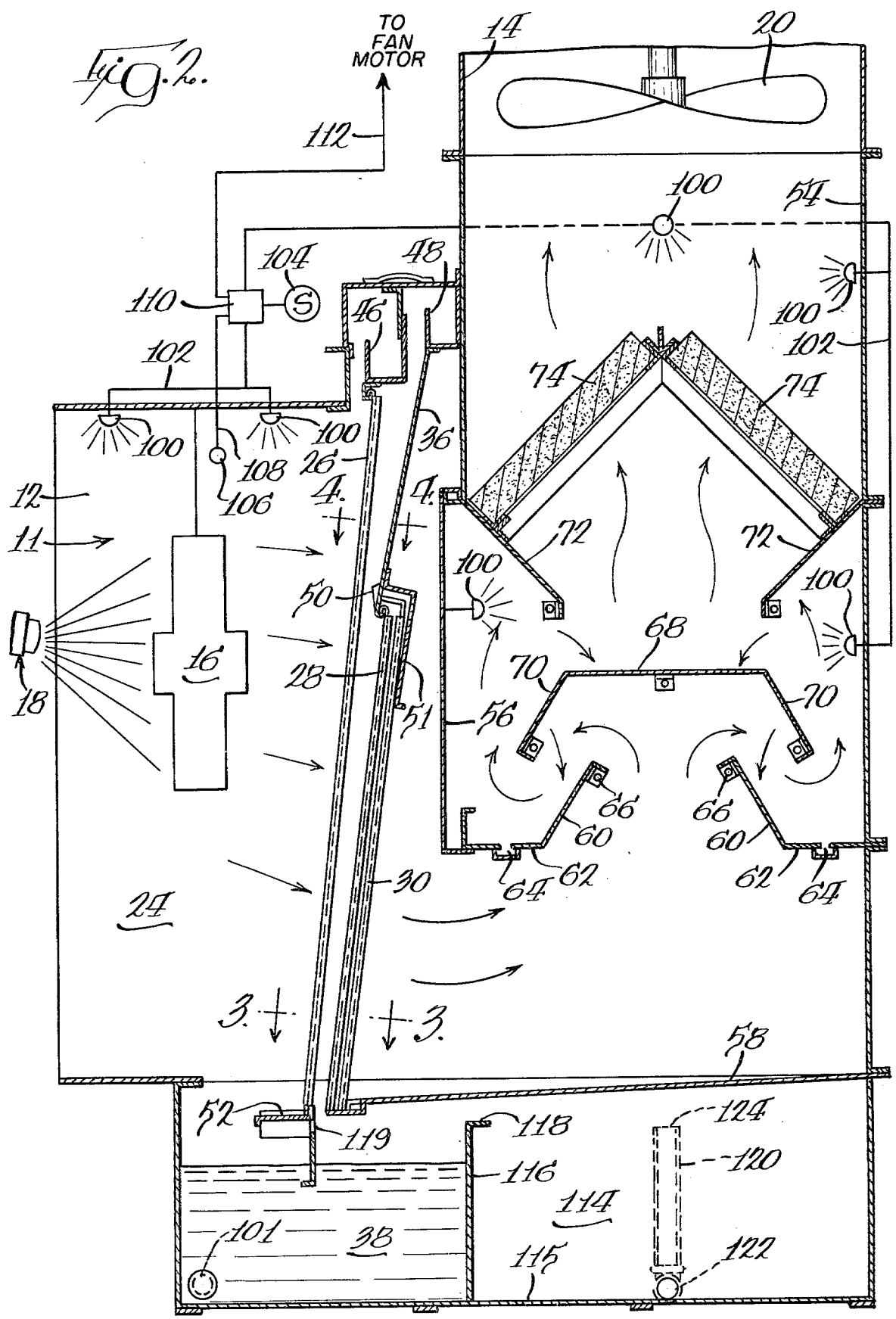

FIRE CONTROL SYSTEM FOR SPRAY BOOTH

This is a continuation of co-pending application Ser. No. 591,162, filed June 27, 1975, now abandoned.

BACKGROUND OF THE INVENTION

The present invention relates to improvements in paint spray booths of the type disclosed in U.S. Pat. No. 3,932,151, issued Jan. 13, 1976, the disclosure of which application is incorporated herein by reference. Said application discloses a paint spray booth for removing excess atomized paint from the air in the vicinity of a paint spraying operation. The spray booth comprises an enclosure having a working or spray painting area, an exhaust chamber and an exhaust stack, which together define an air passage having an inlet at the spray painting area and an outlet at the stack. A fan mounted in the stack draws air through the inlet and the working area at high velocity and discharges it through the stack. A plurality of generally vertical baffles are disposed in the passage between the spray painting area and the exhaust chamber for the purpose of removing overspray or excess atomized paint from the air before it is exhausted out of the stack. Mineral oil is continuously flowed over the front surface of the baffles so as to entrain therein paint solids carried by the air stream. The oil is received in a reservoir or holding tank wherein the paint solids are allowed to settle, and from which the oil is recirculated for flow over the baffles.

The mineral oil in the spray booth does not itself normally constitute a fire hazard because of its high flash point. Inherent in any paint spraying operation, however, is the possibility of fire, due principally to the flammable solvents found in many paint formulations. For this reason, existing governmental regulations and safety standards require the use of adequate fire control systems for spray booths.

A problem arises, however, if water spray or fog means are used in the interior of the above-described booth as a fire control medium. Since the oil reservoir is self-contained in the bottom of the booth, the water from the sprays would drain into the oil reservoir and displace the oil, causing the oil to spill out of the booth. Such occurrence would be undesirable from a safety viewpoint as well as from the standpoint of cleaning up a large amount of oil after the fire had been extinguished.

SUMMARY OF THE INVENTION

The present invention provides a control system within the spray booth which automatically controls the flow of both the water and the oil in the event of a fire, so as to maximize fire fighting efficiency and prevent spilling of oil. In addition, a secondary reservoir may be provided adjacent the primary reservoir to which oil is transferred by the water, the secondary reservoir having a shielded location and limited head space to reduce the available oxygen adjacent the oil, and thereby eliminate or minimize the potential for combustion of the oil.

In the event of a fire, a water fog system is activated within the booth to smother the fire, and the water accumulates in the oil reservoir and displaces the oil. After a relatively small amount of water has accumulated in the reservoir, sufficient to cover the inlet of the recirculating pump, water is pumped from the reservoir onto the collection baffles of the booth instead of the oil, thereby to maximize fire fighting efficiency and to remove the oil from the immediate locus of the fire.

An overflow standpipe having its inlet adjacent the bottom of the reservoir serves, after a certain amount of water has accumulated in the reservoir, to discharge excess water to a suitable drain. Since the water displaces the oil upwardly, nothing more than the very small slug of oil initially in the standpipe (if that) would be discharged to the drain, which would not create any problem or objection, either ecologically or from the standpoint of spillage. The entire remainder of the oil is retained in the booth, without spillage or ecological hazard.

To remove the oil entirely from the vicinity of the fire and minimize the possibility of or potential for the oil reaching its flash point and burning, a secondary reservoir is provided adjacent the primary reservoir, separated therefrom by a weir, and the overflow standpipe is located in the secondary reservoir. As water accumulates in the primary reservoir, the oil is displaced over the weir into the secondary reservoir. When all of the oil has been so displaced, the water flows over the weir into the lower regions of the secondary reservoir and is thereafter discharged therefrom through the standpipe to the drain. The secondary reservoir is closed at its top and provides only very limited head space for the oil—essentially adequate only to accomodate continuing flow of water over the weir. As a consequence, the amount of air or oxygen available in the head space for support of combustion is so severely restricted that the oil will not combust and burn.

In this state or condition, water can be sprayed or fogged into the booth indefinitely to completely extinguish the fire without creating any additional hazard, spillage or ecological problem, and with the oil safely stored in the secondary reservoir for transfer back to the primary reservoir and for reuse once the fire is extinguished.

It is of course apparent that the same advantageous control exists should a water main or pipe burst or should a flood occur. In any such event, the oil will not be spilled, but instead will be safely preserved without detriment to the environment.

Other advantages of the invention will become apparent as the description proceeds.

THE DRAWINGS

FIG. 1 is a perspective view of a simplified form of spray booth that uses oil as a paint collecting medium;

FIG. 2 is a vertical sectional view taken substantially on line 2—2 of FIG. 1, and additionally illustrating the fire control system of the present invention;

FIG. 3 is a sectional view taken along line 3—3 of FIG. 2;

FIG. 4 is a sectional view taken along line 4—4 of FIG. 2;

FIG. 5 is an elevational view of an improvement upon the control system shown in FIG. 2;

FIG. 6 is a vertical sectional view of another embodiment of the control system for the spray booth shown in FIG. 2;

FIG. 7 is a sectional view taken along line 7—7 of FIG. 6; and

FIG. 8 is a fragmentary view, on a slightly reduced scale, similar to FIG. 6 showing an alternate standpipe location.

DESCRIPTION OF THE PREFERRED EMBODIMENTS

FIGS. 1 and 2 illustrate a spray booth 10 having a forwardly extending sheet metal enclosure defining a spray painting or working area 11 and an air intake opening 12 at one side thereof, and a rearwardly disposed housing at the opposite side of the working area defining a vertical exhaust chamber and an upwardly extending stack having an exhaust outlet 14 at the top. Objects to be spray painted, such as indicated at 16 in FIG. 2, are supported in the working area 11 inwardly of the opening 12, and a spray of paint or coating material is directed toward the objects by use of a spray device, such as shown schematically at 18. The coating material may comprise any of the known materials, including but not limited to water and solvent based materials, such as alkyds, nitrocellulose laquers, water base enamels, polyurethanes and epoxy resins.

Means are provided for forcibly drawing air horizontally through the inlet opening 12 and the working area 11, and vertically up and out through the exhaust outlet 14 in substantially an L-pattern, such as a power driven fan 20 located in the exhaust outlet. Excess paint mist and paint overspray in the working area are thus drawn into the interior of the spray booth by a high velocity air flow.

The working area leads rearwardly to the solids eliminator portion of the spray booth or baffle section and is surrounded by a top wall 22 and side walls 24. Spaced rearward from the working area are a plurality of rows of baffle plates 26, 28 and 30, the first row of plates 26 in effect constituting the rear wall of the working area. In general, the rows of baffle plates are arranged in a parallel relationship, and each row comprises a plurality of spaced, general vertical members rigidly supported at their ends in a fixed position.

The baffle plates 26 comprising the outermost row, as shown in FIGS. 2 and 3, are substantially flat and are arranged substantially in a common plane which is substantially perpendicular to the direction of air flow at the inlet, as indicated schematically by the arrows. Adjacent plates are spaced from one another to define narrow open vertical slots 32 therebetween. The baffles are substantially wider than the width of the slots, in the order of about four to about seven times, and the side edges thereof are bent rearward on an obtuse angle.

The second set of baffle plates 28 are similar to the first set in terms of width and spacing from each other, except said plates are slightly V-shaped or concave relative to the direction of air flow, with the side edges being bent rearward on an obtuse angle. The longitudinal centerline of each plate 28 of the second set coincides with the transverse vertical centerline of a respective slot 32 whereby the first and second rows of baffles are arranged in a staggered relationship.

The third row of plates 30 are relatively narrower than the plates of the first two rows and are located behind and are coextensive with the vertical slots 34 between the plates of the second row. The side edges of the plates are bent forwardly, and the space between the third and second rows is less than the space between the first and second rows. The described spacing causes a progressive increase in velocity of air passing through successive rows of baffles.

It will be noted that the respective second and third rows of baffles 28 and 30 are not entirely vertically coextensive with the first row 26; instead, the former are shorter than the first row and are suspended in a spaced relationship from a solid or non-permeable web 36 extending downward and supported from the top of the enclosure in parallel with the first row of baffles. Preferably, the length of the web 36 is about one-third of the length of the first row of baffle plates 26. The web 36 serves to alter the normal rate of air flow from the top to bottom of the first two rows of baffle plates, such that air flow is equalized or uniform from top to bottom and side to side of the working area, and such that no area of the plates will be subjected to an excessively high air flow that would strip the oil therefrom.

The rows of baffle plates are arranged in a spaced staggered relationship to provide for successive positive, and at least right angle, deflection of any paint and oil particles which emerge through the first group of vertical slots 32, and the final row of baffle plates 30 serve as collectors of oil and solids particles which may be carried through the downstream passages by the high velocity air flow. The air velocity is also rapidly increased up to the final row of baffles in order to increase the straight line momentum of any oil particles, which would otherwise tend to move in a tortuous path with the air flow around the baffles instead of collecting on the final row of baffles as desired.

Means are provided for establishing a continuous and uniform flow of oil down the front surfaces of the first and second rows of baffle plates, 26 and 28 respectively. A reservoir 38 of mineral oil is provided in the bottom of the enclosure, and is connected, via a suitable pump 40 and line 42, to the top of the enclosure. The line 42 is connected to a bifurcated branch 44 leading into respective troughs 46 and 48 located respectively over and co-extensive with the first and second rows of baffle plates 26 and 28. The troughs 46 and 48 have lowered foward edges which allow the oil to spill over and down the front surfaces of the first row of baffle plates 26 and web 36.

As shown in FIG. 4, the lower edge portion of the web 36 is provided with a spaced series of V-shaped channels 50 located above respective individual baffle plates of the second row 28. The channels 50 serve to funnel or concentrate the oil moving downward on the web into the central portion of the front surfaces of baffles 28, which has been found to minimize stripping and loss of oil by the air flow as the oil moves down the baffles. The third row of baffle plates 28 are not directly supplied with oil and are supported by a bracket 51 secured to the rear side of the web 36.

The lower ends of the front baffles 26 are connected to a substantially horizontal drain board 52 spaced slightly above the oil level in the reservoir 38, such that the paint laden oil falls a short distance into the reservoir, which has been found to minimize splashing and build-up of paint scum on the surface of the oil in the reservoir. The mere draining of paint laden oil onto the surface of the oil in the reservoir may allow the paint solids to float and cling together, whereas a slight drop causes the solids to penetrate the surface of the oil, become thoroughly wetted and sink to the bottom of the reservoir. The lower edges of the rear baffles 28 and 30 are spaced above the reservoir oil level to provide the same effect.

The drain board 52 includes a vertical wall portion extending downwardly into the oil in the reservoir to mitigate air flow beneath the board and consequent by-passing of the first set of baffles.

It will be noted that the baffles 26, 28 and 30 are preferably inclined downward and forward on a slight vertical angle, preferably in the order of 3 to 4 degrees and no greater than 5 degrees, in order to enhance the continuity of oil flow thereon. An angle greater than 5 degrees from vertical is not desirable due to the tendency of the baffle edges to lose their oil coating.

Important features of the baffle system include the substantial width or frontal surface area of the baffles in comparison to the width of the air passage slots therebetween, and the arrangement of the flow through the booth. These features allow for a maximum exposure of the moving films of oil to the contaminated air. Also, the planar or sightly concave quality of the baffles, together with the uniform spacing of the air slots therebetween, permits a very high air flow thereover without the oil being wiped from the surface, which would allow the indesirable accumulation of paint on the bare surfaces. The baffles are free from sharp corners, or corners which are less than 90 degrees, because sharp corners would be wiped clean of oil by the high velocity air, especially in the vicinity of the slots. Hence, the baffle design described herein is particularly adapted to present large and efficient oil coated surfaces which retain their oil coating under conditions of high velocity air flow, which, at the first set of baffles may be 125 linear feet per minute and at the second set of baffles, in the order of 2300 linear feet per minute.

Another important feature in the design of the baffle system is the existence of a substantially uniform air flow from top to bottom and from side to side in the inlet opening. In contrast with a water wash booth having a relatively small waterfall area and high resistance to air flow, the present baffle system offers relatively low resistance to air flow due to the length of the slit openings and spacing of the baffle rows, thus allowing use of a relatively low horsepower motor.

As shown in FIG. 2, located rearwardly or downstream of the first baffle system is a second baffle system, the primary purpose of which is to collect and remove oil particles which escape from the first baffle system. Whereas the first baffle system is arranged in substantially a vertical plane, the second system is arranged horizontally in a vertical exhaust chamber 54 upstream from the exhaust outlet 14. The chamber 54 comprises a forward vertical wall 56 spaced rearward from the first baffle system, which extends downward from the top of the enclosure and terminates at a location above a forwardly sloping base 58 and below the tops of the rear baffles 28 and 30, preferably at a point approximately at the horizontal center line of said baffles. As shown by the arrows indicating air flow, air entering at the top of the first set of baffles is swept downward around the wall 56 and then upward into the vertical chamber 54.

As shown, the second baffle system comprises, at the lower entrance of the chamber 54, a first pair of upwardly converging baffles 60 connected to opposite chamber walls by respective horizontal portions 62 having covered openings 64 therein to collect and drain away accumulated oil. The respective end edges of the baffles 60 are supported upon clips 66, said edges having a relatively wide space therebetween to channel and concentrate air flowing therethrough.

A deflecting baffle 68 supported by clips is provided upstream from and in the outlet path of the converging baffles 60. The baffle 68 comprises a horizontal portion which is wider than the outlet of baffles 60 and is connected to opposite legs 70, which are disposed in a downward obtuse angle from the horizontal portion, the ends of said legs being spaced outward from and about on the same level as the ends of the baffles 60. The legs 70 are spaced from the sides of the chamber 54, and air is caused to flow in a tortuous path around the legs, causing oil to accumulate thereon and fall downward onto horizontal portions 62.

A pair of downwardly angled baffles 72 are connected from the chamber walls above the legs 70 of the deflecting baffle 68. The baffles 72 are substantially planar and have terminal edges which extend over the juncture between the legs 70 and the horizontal portion of baffle 68, so that the space between said terminal edges is less than the width of baffle 68. Thus, the baffles 72 are disposed in the path of the air which emerges around the baffle 68 and serve to further deflect the air flow toward the top of the underlying baffle 68.

Disposed above baffles 72 are a pair of permeable air filters 74 arranged in an inverted V-configuration. The filters 74 may be composed of a mesh material comprising of metal, glass fibers, or the like, supported in a frame. The filters 74 serve to remove the final finite traces of oil before the air reaches the exhaust outlet 14.

The type of oil employed is preferably a mineral oil without detergents or other additives, and having a viscosity to easily flow down the baffles at room temperature without undue vaporization. A mineral oil having a viscosity of 660 Standard Saybolt Units at 100° F. has been found to be suitable, although other viscosities may be employed. A suitable oil flow rate is approximately 8 gallons per minute for each foot of width of baffles, and the reservoir preferably contains at least about 25 gallons per foot of baffle width, to provide sufficient volume for settling of the paint solids.

Mineral oil offers several advantages, including a high flash point and burning point, and is incompatable and chemically unreactive with paint solids in current use. Because the oil has a lower density than the paint solids, the solids tend to settle to the bottom of the reservoir where they may be removed. Moreover, the flammable volatile solvent components of the paint are not absorbed by the oil and do not lower the flash point or burning point thereof. The presence of paint solids which may remain entrained in the circulating oil does not substantially affect the efficiency of the eliminator baffles.

In operation, the fan 20 and oil pump 40 are activated, such that oil is pumped from the reservoir 38 upward through the line 42 into the troughs 46 and 48. A continuous supply of oil flows down over the first and second rows of baffles, 26 and 28, and air is drawn through the inlet opening 12 at a rate of at least 60 linear feet per minute and preferably in excess of 100 linear feet per minute.

With the booth in readiness, objects, such as indicated at 16, are disposed in or near the opening 12, and a paint spray device 18 is located upstream of and aimed at the object.

Atomized paint which does not adhere to the object 16 is carried by the high air flow into contact with the first baffles 26, which are entirely covered with a continuously moving film of oil. As a result, the solid paint particles are entrained in the oil and flushed downward into the reservoir 38, where the paint solids are allowed to settle. Paint particles which avoid the first baffles 26 and pass through the air slots 32 increase in momentum and are driven into contact with the oil rushing down the front surfaces of the baffles 28 of the second set, which serves to remove the particles from the air the same as the oil on the first set of baffles. The air is then required to take several sharp angle turns at increasing velocity and to forcibly contact the third set of baffles 30, which are normally wetted by oil removed from the first two rows of baffles, whereby to remove essentially all of the paint particles from the air.

After the air has passed through the eliminator baffles, it passes under the barrier wall 56 and moves upwardly in the chamber 54, thereby encouraging elimination of oil mist by gravity forces. Also the chamber 54 presents a relatively larger volume than the volume near the eliminator baffles, which causes a reduction in air velocity and decreases the abillity of the air to carry any residual oil.

The air is deflected off the successive baffles 60, 68 and 72 such that virtually all residual oil is removed from the air and is returned to the reservoir. The filter 74 serve as a final precaution to the escape of minute particles into the air.

After the booth has been used over a period of time, the paint solids which have collected in the bottom of the reservoir may be removed and reclaimed.

In comparison to other known spray booths, this spray booth offers the following advantages: very low emission of particulates into the atmosphere since the booth will normally operate at 99 or 100% efficiency; easy collection and reclaimation of coating material solids; ability to accommodate a greater variety of coatings; easier cleaning of booth and no corrosion of booth materials; quieter operation and uniform air velocity at face; less electrical power required; permanent wash medium; no evaporation and no make-up; no compounding; no odor; no bacterical growth; no sewer line contamination; safer environment; quieter operation; longer life of booth, pump and other components; and many other advantages. Most importantly, the affinity of the oil for the baffles and the design of the baffles permits use of a slotted baffle back wall for the spray chamber and as a consequence uniform air flow over the whole face of the booth.

For the sake of added safety and to comply with governmental and underwriter regulations, the booth is equipped with a water fog system for controlling and extinguishing accidental fires which may develop within the booth interior. As shown schematically in FIG. 2, a plurality of water spray or fog nozzles 100 are provided in a spaced relationship within the working area 11 and within the vertical exhaust chamber 54 of the booth 10. The nozzles 100 are preferably mounted on the interior top and side walls of the booth and are spaced in such a manner as to fill the working area 11 and exhaust chamber 54 with a dense water fog when said nozzles are opened. Suitable supply lines 102 are connected between the nozzles 100 and a source 104 of water under pressure. For the sake of clarity, the connection between the supply line 102 and the nozzle 100 on wall 56 has been omitted but such connection may be presumed.

If desired, each nozzle 100 may be individually controlled by a conventional heat fusible member or link that is incorporated into the nozzle, causing the nozzle to open and discharge water upon attainment of a prescribed temperature due to fire. In such case, only those nozzles near the fire or heat source would be opened. In the alternative, separate electrical heat sensors, such as 106, may be employed to operate a group or all of the nozzles conjointly. In the latter case, the sensor 106 would be electrically connected by a conductor 108 to an electric switch and normally closed valve mechanism 110 located between the water supply 104 and the nozzles 100. Activation of the sensor 106 would thus cause the valve 110 to open and allow flow of water to all of the nozzles.

To the extent that continued operation of the fan 20 is not desirable during a fire, an interlock system may be provided on the fan motor whereby the motor is disconnected upon activation of the nozzles. In the embodiment shown, the switch/valve device 110 may be connected by a conductor 112 to a shutoff switch (not shown) on the fan motor, whereby activation of the sensor 106 will serve to shut off the fan. The pump 40 (FIG. 1), however, need not be disconnected in the event of a fire, and in practice according to this invention is preferably maintained energized.

Since the spray booth has a self-contained oil supply in the form of a holding tank or reservoir 38 of limited volume, a difficulty will arise when the water fog nozzles 100 remain open for an appreciable length of time. The water from the nozzles 100 will drain into the reservoir 38, and having a higher specific gravity than the oil in the reservoir, will settle to the bottom of the reservoir, thereby causing the oil level to rise. If suitable precautions are not taken, the displaced oil would eventually spill over the top edge of the reservoir and onto the floor surrounding the booth, thereby causing the floor to become slippery and hazardous and necessitating laborious clean-up, and also potentially contributing to the fire hazard. Also, the oil in reservoir 38 is exposed to the working area 11 of the booth, thus increasing the potential hazard if the fire is in the working area. Connection of the oil reservoir to a sewer drain is not acceptable because of pollution regulations.

In accordance with the present invention, the problems outlined are overcome simply and with complete safety. As shown in one embodiment in FIG. 2, a secondary, normally empty, reservoir 114 is provided adjacent the primary oil reservoir 38, the purpose of which is to collect oil which is displaced from the primary reservoir by water during operation of the water nozzles 100. The reservoir 114 is preferably located in the rear lower portion of the spray booth adjacent the reservoir 38 and beneath the drain board 58, the reservoir being defined by the bottom 115, and the rear and side walls of the booth. The secondary reservoir 114 has a greater volumetric capacity than the oil reservoir 38 and is separated from the primary reservoir 38 by a vertical partition or weir 116. The weir 116 extends from side wall to side wall of the booth and is sealingly connected, for example, by a continuous weld, to the bottom wall and the two side walls of the booth. The upper edge 118 of the weir 116 is lower than any spillover level of the oil reservoir 38, particularly the front edge of the oil reservoir, and is spaced from the underside of the drain board 58. The booth structure therefore completely encloses and seals the secondary reservoir 114 except for the slot defined between the weir edge 118 and the drain board 58. This slot is purposely maintained as narrow as safely feasible, taking into consideration the rate at which oil will be displaced from the reservoir 38 by the water from the nozzles 100, so as to maintain only limited head space and limited air supply in the secondary reservoir whereby to reduce available oxygen and minimize the potential for combustion of the oil.

To insure that all of the oil is transferred out of the primary reservoir and into the secondary reservoir, the vertical leg or wall of the drain board 52 is provided with slots 119 at the level of the weir 118 so that oil forwardly of said leg or wall will be transferred rearwardly through the slots and over the weir.

It is apparent that continued operation of the water fog nozzles 100 would eventually cause water to enter the secondary reservoir and displace the oil therein. To accommodate draining of water from the reservoir while retaining essentially all of the oil therein, the reservoir, in the embodiment shown in FIG. 2, is equipped with a vertical standpipe 120 mounted on an external wall of the reservoir and having an inlet 122 connected into the reservoir adjacent the bottom thereof. The standpipe 120 is provided at or adjacent its upper end with an outlet 124 which may either overflow onto the floor if a floor drain is located close by, or be connected by piping (not shown) to drain. The outlet 124 is located below the level of the upper edge 118 of the weir 116, and above the level the oil will attain when all of the oil has been transferred to the reservoir 114 by a distance slightly greater than the spacing of the top of the inlet 122 from the bottom 115 of the reservoir.

In operation, as oil in the primary reservoir 38 is displaced by the water from the fog nozzles 100, the oil flows over the weir 116 into the secondary reservoir and starts rising in the reservoir and the standpipe. When all of the oil has been displaced from the primary reservoir, the liquid level in the secondary reservoir will lie below the upper edge of the weir and also below the outlet 124 of the standpipe 120; the standpipe of course containing oil up to the same level. Then, water will commence flowing ove the weir and start to displace the oil upwardly in both the reservoir and the standpipe until the standpipe inlet 122 is totally immersed in water. Continued flow of water then causes the liquid level in the secondary reservoir and the standpipe to rise to the outlet of the standpipe, whereupon liquid will be discharged from the standpipe outlet without further upward displacement of the oil in the reservoir 114. Since liquid seeks its own level, water entering the reservoir 114 will flow in a continuous stream to the bottom of the reservoir and upwardly through the standpipe 120 and its outlet 124 to the drain.

As a consequence, only the small slug of oil that had initially accumulated in the standpipe 120 is discharged to the drain, all of the remainder of the oil is safely stored in the reservoir 114, and essentially only clear water is discharged to the drain.

In order to prevent even the small quantity or slug of oil from being discharged to the drain, a secondary standpipe system may be employed, as shown in FIG. 5. In this structural arrangement, a small pot 120a having a capacity to hold the said slug of oil is mounted on the standpipe 120 adjacent the outlet 124 thereof. The pot has an inlet 122a connected into the standpipe below the outlet 124 and well above the inlet 122 and an outlet breather tube 124a extending from the upper end thereof to a location well above the standpipe outlet 124. Consequently, when the oil is first displaced upwardly in the standpipe by the rising water, the slug of oil in the standpipe is transferred in its entirety into the pot 120a, but cannot be discharged therefrom because its outlet 124a is well above the outlet 124 of the standpipe. Thus, only essentially clear water would be discharged from the booth to the drain.

This secondary standpipe system can also be incorporated into the structure of the booth, along with a primary standpipe system, as shown in the embodiment of FIG. 6. This structure is the same as that of FIG. 2, except for the standpipe system, including the same primary and secondary reservoirs 38 and 114 and the same weir 116. Within the reservoir 114, preferably in one rear corner thereof as shown in FIG. 7, a standpipe system is defined by vertical sheet metal partitions 130 and 131 which extend upward to a level above the upper edge of the weir 116 but below the drain board 58. An overflow or standpipe outlet 134 is provided in the booth side wall between the partitions 130 and 131 at a level below said weir edge as previously described.

The first or forward partition 130 which may be generally L-shaped, extends between and is sealingly connected to one side wall and back wall of the booth, and to that portion of the booth bottom that lies between the second partition 131 and the back wall of the booth. Forwardly of the partition 131, the partition 130 defines or has therein one or more narrow slots 132 closely adjacent the bottom wall 115 of the booth and comprising the standpipe inlet.

The second partition 131 is formed of two overlapping vertical segments 138 and 140 which extend between the side wall of the booth and the opposed wall portion of the partition 130. The first segment 138 is sealingly connected at its bottom and sides to the booth and the partition 130 and extends from the bottom wall up to a level somewhat below the outlet 134. The second segment 140 extends downward from above the outlet and terminates at a point spaced below the upper edge of the segment 138 but above the booth bottom wall 115. The segment 140 is spaced slightly rearward from the segment 138 to allow liquid to drain over the upper edge of the first segment and downward between the two segments.

The partitions 130 and 131 thus provide in one rear corner of the booth a primary standpipe system 142 having an inlet 132 and an outlet 134. The segments 138 and 140 in turn define the inlet to and a secondary standpipe system 144. This secondary system serves to collect the initial charge of oil that enters the standpipe 142 before said standpipe becomes filled with water, whereby all of the oil is retained in the reservoir and only essentially clear water is discharged through the outlet 134.

The operation of the fire control system will now be described. In the event of a fire within the spray booth, one or more of the nozzles 100 will be opened, thereby creating a blanket of water spray, mist or fog to extinguish the fire. Normally, the fan 20 will be switched off to prevent disruption of the fog within the booth. The oil pump 40 however will continue to operate.

The water collecting within the booth drains into and settles to the bottom of the oil reservoir 38 eventually causing the displaced oil to drain into the secondary reservoir 114. When sufficient water has collected in the reservoir 38 to cover the pump inlet (see 101 in FIG. 2) continued operation of the pump causes water to be pumped upward onto the baffle system, thus eliminating the oil from the interior of the booth, removing a potential fuel from the locus of the fire and recirculating the water for quenching the fire.

As the water continues to fill the reservoir 38, all of the oil is displaced over the weir 116 into the secondary reservoir 114, which is essentially a sealed compartment having only limited headspace due to the overhead drain board 58. The confines of the secondary reservoir 114 thus prevent the entry of sufficient air to support combustion, and the oil is isolated safely away from the fire, thereby greatly reducing or entirely eliminating a possible secondary fire.

Continued flow of water into the reservoir 38 will eventually cause flow of water over the weir 116 into the secondary reservoir 114, where the water again settles to the bottom. As additional volumes of water enter the reservoir 114, water flows up the standpipe 120 and out through the outlet 124, while practically all of the oil remains in the reservoir.

The operation of the embodiment of FIG. 5, which has already been described, serves to prevent the discharge of any oil.

In the embodiment shown in FIGS. 6 and 7, as oil is displaced into the secondary reservoir 114, the oil also flows through the inlet slot 132 and rises in the chamber 142. After the reservoir 38 has been depleted of oil, water enters the secondary reservoir 114 and flows through the slot 132 into the chamber 142, displacing the oil thereabove. As the displaced oil rises in the chamber, it flows over the segment 138 and down into the secondary standpipe or collection chamber 144. Thereafter, the water level in the chamber 142 will continue to rise until water flows out of the outlet 134.

It is thus seen that the present invention not only provides a fire control system for a spray booth in which oil is used as the paint collecting medium, but that the operation of the system saves essentially all of the oil, discharges only essentially clear water to the drain, and automatically removes the oil from the immediate vicinity of the fire to a safely stored location. Moreover, displacement of the oil provides another safety feature, in that water instead of oil is pumped up onto the baffles to further assist in fire control.

After the fire has been extinguished, the water turned off, and water removed from the reservoir 38 and the bottom of reservoir 114, the oil is quite easily transferred or pumped from the secondary reservoir 114 back into the reservoir 38 for further use.

It will of course be apparent that these same safety features are inherent in the booth and will be operable in the event a water pipe or main should burst or in the event of flood. Even if there should be a simultaneous loss of electric power, the entire system would operate automatically as above described except that water would not be pumped over the baffle system. Nevertheless, the oil would be removed to and stored in a safe location and would not be spilled on the floor or into a drain.

What is claimed is:

1. In a paint spray booth comprising an enclosure having an upper portion, a primary reservoir beneath said enclosure containing oil at a given level, a secondary reservoir adjacent the primary reservoir, a weir separating said reservoirs, means for circulating oil from said primary reservoir to said upper portion of said enclosure, said oil returning to said primary reservoir by gravity, a fire control system in said spray booth comprising means for providing a discharge of water within said enclosure in response to a fire, said water collecting and draining into said primary reservoir and settling to the bottom thereof while first displacing the oil therefrom into said secondary reservoir and then flowing over said weir into said secondary reservoir, and means associated with said secondary reservoir for causing discharge of said water therefrom while retaining said oil therein, said discharge means comprising a standpipe having an inlet adjacent the bottom of said secondary reservoir and an outlet to the exterior of both of said reservoirs, the outlet of said standpipe being located at a level above the level of the oil in said secondary reservoir and below the level of the top of said weir.

2. The paint spray booth of claim 1 wherein said standpipe is connected to secondary standpipe means having an inlet below the outlet of said standpipe for receiving and retaining oil initially entrapped in said standpipe.

3. The paint spray booth of claim 1 wherein the outlet of said standpipe is spaced above said given level of the oil in said reservoir means by a distance at least equal to the spacing between the bottom of said reservoir means and the top of the inlet of said standpipe.

4. In an arrangement for removing water flowing into a reservoir containing oil and displacing the oil upwardly, the reservoir being located beneath a paint spray booth and containing oil to a level below the level of the top of said reservoir: a standpipe in said reservoir, said standpipe having an inlet in communication with a lower portion of said reservoir and having an outlet to the exterior of said reservoir, the outlet of said standpipe being located at a level about the initial level of the oil in said reservoir and below the level of the top of said reservoir so that water only will be discharged from said reservoir after the oil therein has been sufficiently displaced by the water flowing into said reservoir such that the level of water is above said inlet, said oil being retained in said reservoir.

* * * * *